(12) United States Patent
Taguchi et al.

(10) Patent No.: US 10,596,834 B2
(45) Date of Patent: Mar. 24, 2020

(54) LIGHT IRRADIATION DEVICE AND PRINTER

(71) Applicant: KYOCERA Corporation, Kyoto-shi, Kyoto (JP)

(72) Inventors: Akira Taguchi, Yasu (JP); Masami Takubo, Yasu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/079,301

(22) PCT Filed: Mar. 30, 2017

(86) PCT No.: PCT/JP2017/013427
§ 371 (c)(1),
(2) Date: Aug. 23, 2018

(87) PCT Pub. No.: WO2017/170949
PCT Pub. Date: Oct. 5, 2017

(65) Prior Publication Data
US 2019/0054745 A1    Feb. 21, 2019

(30) Foreign Application Priority Data

Mar. 30, 2016 (JP) .................. 2016-067224
Jul. 27, 2016 (JP) .................. 2016-147331

(51) Int. Cl.
*B41J 11/00* (2006.01)
*B05C 9/12* (2006.01)
*B41J 2/01* (2006.01)

(52) U.S. Cl.
CPC ............. *B41J 11/002* (2013.01); *B05C 9/12* (2013.01); *B41J 2/01* (2013.01)

(58) Field of Classification Search
CPC .... B41J 11/002; B41J 2/01; B41J 2/45; B05C 9/12
USPC .......................................... 347/101, 102, 104
See application file for complete search history.

(56) References Cited

U.S. PATENT DOCUMENTS

| 9,994,045 | B2 * | 6/2018 | Sato .................. B41J 11/0015 |
| 10,167,401 | B2 * | 1/2019 | Nishiyama ............... B41M 7/00 |
| 2004/0184973 | A1 | 9/2004 | Hahne et al. |
| 2005/0062830 | A1 * | 3/2005 | Taki .......................... B41J 2/45 347/130 |

FOREIGN PATENT DOCUMENTS

| JP | 63-092194 U | 6/1988 |
| JP | 63-185444 A | 8/1988 |
| JP | 10-100379 A | 4/1998 |
| JP | 2004-243316 A | 9/2004 |
| JP | 2005-081277 A | 3/2005 |
| JP | 2005-118632 A | 5/2005 |

(Continued)

*Primary Examiner* — An H Do
(74) *Attorney, Agent, or Firm* — Volpe and Koenig, P.C.

(57) ABSTRACT

The disclosure relates to a light irradiation device which can improve curability of photo-curable materials. A light irradiation device includes a first supply section having a porous portion, the first supply section being capable of supplying a gas to a photo-curable material through the porous portion; and an irradiation section disposed in alignment with the porous portion or disposed downstream from the porous portion, the irradiation section being capable of irradiating the photo-curable material with light.

20 Claims, 9 Drawing Sheets

(56) References Cited

FOREIGN PATENT DOCUMENTS

| JP | 2008-104957 A | 5/2008 |
| JP | 2008-244165 A | 10/2008 |
| JP | 2015-160890 A | 9/2015 |

* cited by examiner

FIG. 1

CONVEYANCE DIRECTION
(FIRST DIRECTION)

CONVEYANCE DIRECTION

LIGHT IRRADIATION DEVICE AND PRINTER

TECHNICAL FIELD

The present invention relates to a light irradiation device for use in curing of photo-curable resin, paint, etc., and a printer.

BACKGROUND ART

Light irradiation devices are finding a wide range of applications, including curing of photo-curable materials (resin, ink, etc.) (refer to Patent Literature 1, for example). Thus, there is a growing demand for a light irradiation device which can improve curability of photo-curable materials.

CITATION LIST

Patent Literature

Patent Literature 1: Japanese Unexamined Patent Publication JP-A 2008-244165

SUMMARY OF INVENTION

A light irradiation device in accordance with one embodiment of the invention comprises a first supply section and an irradiation section. The first supply section, which has a porous portion, can supply a gas to a photo-curable material through the porous portion. The irradiation section, which is disposed in alignment with the first supply section or disposed downstream from the first supply section, is capable of irradiating the photo-curable material with light.

Moreover, a light irradiation device in accordance with one embodiment of the invention comprises a first supply section and an irradiation section. The first supply section, which has a porous portion, can supply a gas to a photo-curable material through the porous portion. The irradiation section, which is disposed so that the porous portion of the first supply section is located between the irradiation section and the photo-curable material, is capable of irradiating the photo-curable material with light.

Moreover, a printer in accordance with one embodiment of the invention comprises the above-described light irradiation device and a conveying section which can convey the photo-curable material downstream. The photo-curable material, which is located on an upper surface of the conveying section, comprises a photo-curable material which comprises an initiator.

DESCRIPTION OF EMBODIMENTS

The following describes a light irradiation device and a printer according to embodiments of the invention with reference to the drawings. It is noted that the following description is for purposes of illustration of embodiments of the invention, and the invention is not limited to these embodiments.

In a light irradiation device known in the art, a reaction between radicals generated by irradiation of a photo-curable material with light and atmospheric oxygen may inhibit curing reaction of resin or ink.

In a light irradiation device according to an embodiment of the invention, a porous portion which supplies a gas to a curable material is disposed in alignment with or upstream from a irradiation section capable of irradiation of a photo-curable material with light, and thus atmospheric oxygen (concentration) can be reduced effectively. This makes it possible to restrain radicals generated by irradiation of the photo-curable material with light from reacting with atmospheric oxygen, and thereby improve curability of the photo-curable material.

First Embodiment (Light Irradiation Device)

Figure 1:
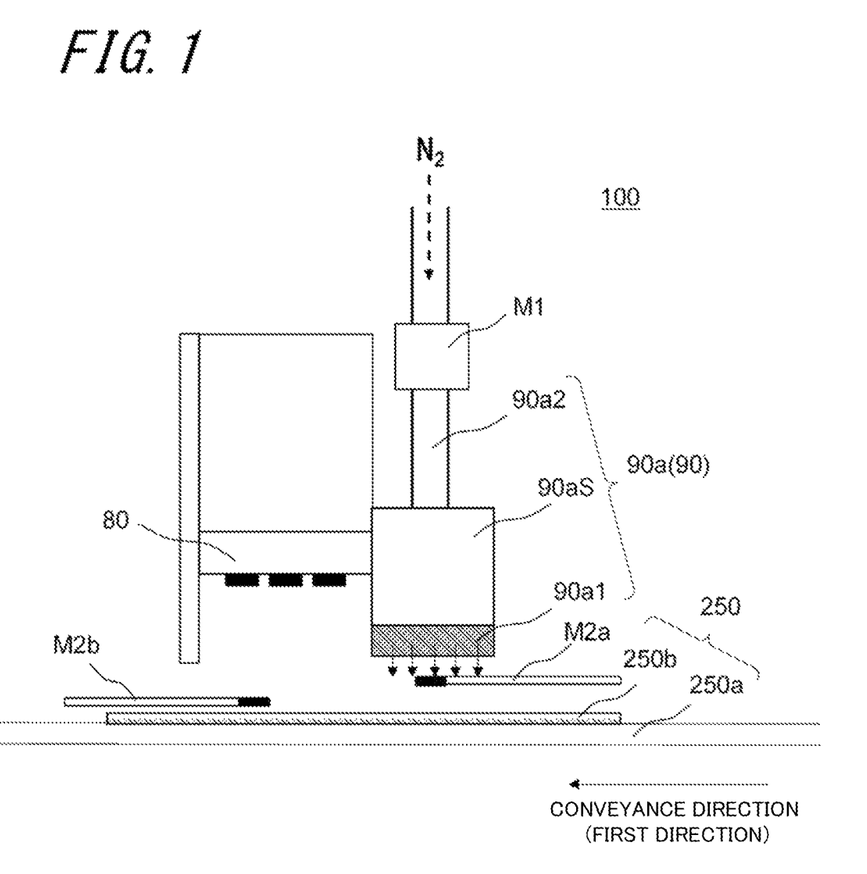
FIG. 1 is a side view showing a light irradiation device according to a first embodiment of the invention.
Figure 2A:
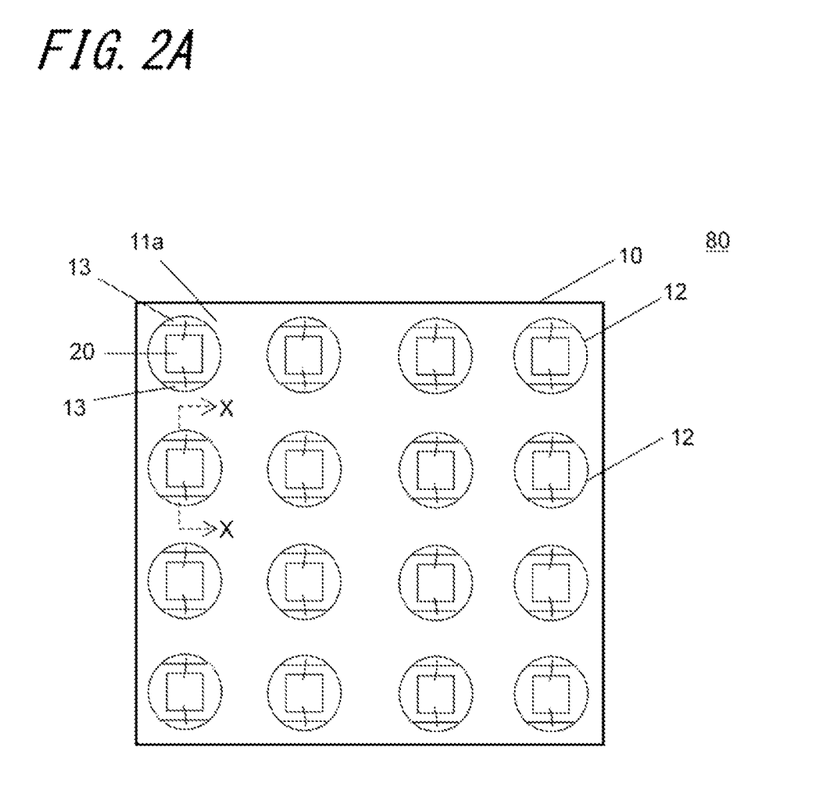
FIG. 2A is a plan view showing an irradiation section of the light irradiation device shown in FIG. 1.
Figure 2B:
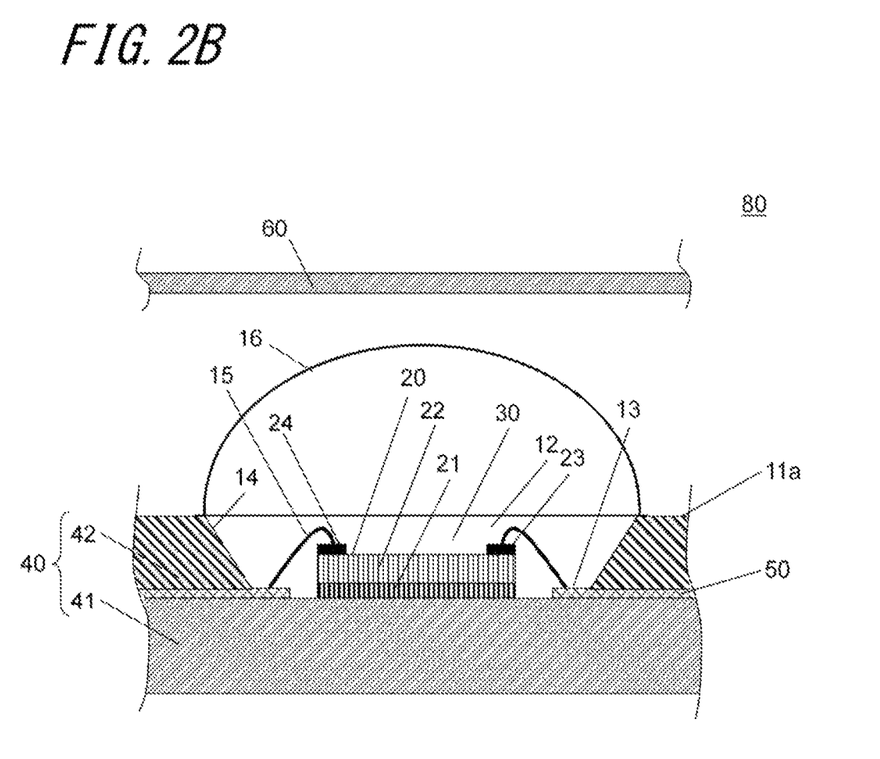
FIG. 2B is a sectional view of an irradiation section taken along the line X-X shown in FIG. 1.

A light irradiation device 100 according to a first embodiment of the invention as shown in FIGS. 1, 2A, and 2B, which is incorporated into a printer 200 in which a photo-curable material (e.g., an ultraviolet-curable ink) is used, such as an offset printer or an ink-jet printer, serves as a light source which irradiates a target object (recording medium) 250 coated with a photo-curable material with light to cure the photo-curable material.

The light irradiation device 100 comprises an irradiation section 80 and a first supply section 90*a*.

(Irradiation Section)

Figure 7A:
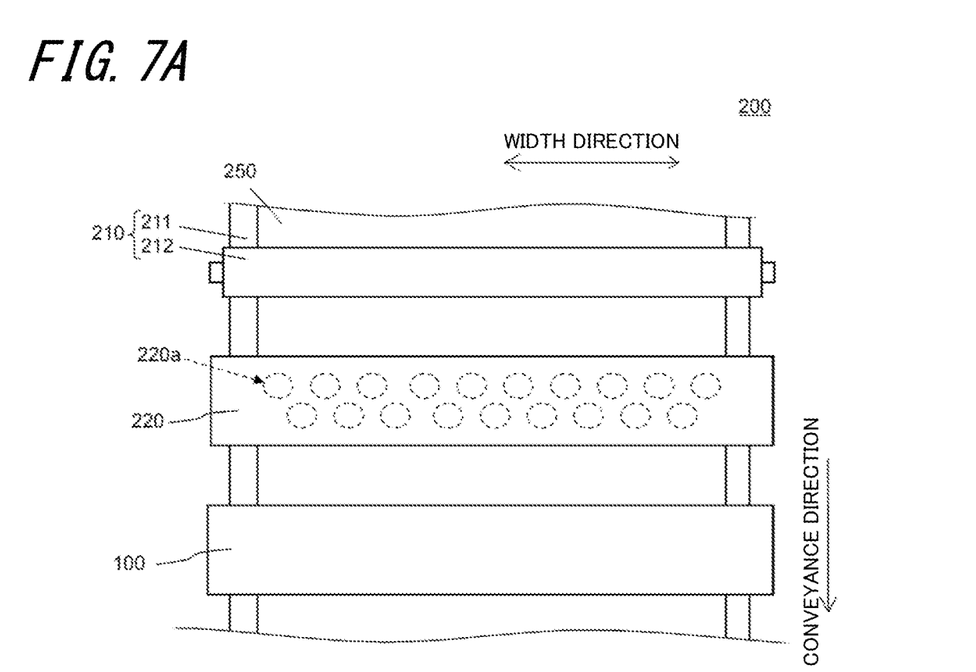
FIGS. 7A and 7B are views showing a printer incorporating the light irradiation device shown in FIG. 1.
Figure 7B:
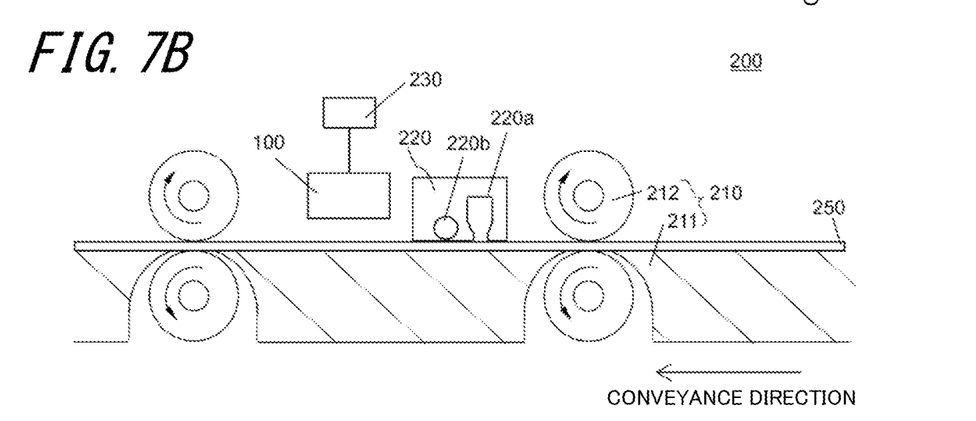

While the irradiation section 80 will now be described, in this embodiment, any construction that can be irradiated with light which cures a photo-curable material may be adopted for the irradiation section 80 without limitation to the following example. As shown in FIG. 1, the irradiation section 80 is positioned in alignment with a porous portion 90*a*1 of the first supply section 90*a* as will hereafter be described, or positioned downstream from the porous portion 90*a*1, for irradiation of a photo-curable material 250*b* with light. As employed herein the term "positioning in alignment or downstream" defines a concept regarding positional relationship in a conveyance direction of the photo-curable material 250*b* (the first direction) as shown in FIGS. 7A and 7B. This means, in the specification, that the irradiation section 80 is disposed in alignment with the porous portion 90*a*1 or located downstream from the porous portion 90*a*1 with respect to the above-described conveyance direction. Moreover, the expression "the irradiation section 80 is located in alignment with the porous portion 90*a*1" defines a concept which can be construed as encompassing a case where the irradiation section and the porous portion are disposed in partly overlapping relation with each other in the conveyance direction.

FIG. 2A is a plan view showing the irradiation section of the light irradiation device shown in FIG. 1, and FIG. 2B is a sectional view of the irradiation section taken along the line X-X shown in FIG. 1. In this embodiment, as shown in FIGS. 2A and 2B, the irradiation section 80 comprises: a substrate 10 having a plurality of recesses (openings) 12 formed in an upper surface (one principal face) 11a thereof; and a light-emitting element 20, located in the recess 12, for emitting light. As shown in FIG. 2A, the irradiation section 80 can be configured to have the plurality of recesses 12, and a plurality of light-emitting elements 20 are disposed corresponding to the recesses 12. Moreover, the irradiation section 80 may comprise a plurality of connection pads 13 each disposed inside corresponding one of the recesses 12, a plurality of light-emitting elements 20 each disposed inside corresponding one of the recesses 12 of the substrate 10 so as to be electrically connected to the connection pad 13, and a plurality of sealing materials 30, each disposed so as to fill corresponding one of the recesses 12, for covering the light-emitting element 20. The irradiation section 80 may further comprise a lens 16 which covers the light-emitting element 20 so as to be spaced away from the light-emitting element 20. The substrate 10 may be formed as a recess-free flat plate-shaped substrate, and, in this case, the plurality of light-emitting elements 20 are disposed on the flat plate-shaped substrate. Note that the sealing material 30 and the lens 16 are not essential components, and accordingly may not be provided. Moreover, as shown in FIG. 2B, the irradiation section 80 may comprise a light-transmittable member 60, spaced away from each of the constituent components, for enabling the exit of light emitted from the light-emitting element 20 from the construction. The light-transmittable member 60 is not an essential component.

The following describes the details of each constituent component.

The substrate 10 comprises: a stacked body 40 in which a first insulating layer 41 and a second insulating layer 42 are laminated; and an electrical wiring 50 which connects the light-emitting elements 20. The substrate 10 has a rectangular shape in plan configuration viewed from the one principal face 11a side, and, the light-emitting element 20 is supported inside the recess 12 formed in the one principal face 11a.

For example, the first insulating layer 41 is formed of ceramics such as an aluminum oxide sintered body, an aluminum nitride sintered body, a mullite sintered body, or glass ceramics, or a resin such as epoxy resin or a liquid crystal polymer (LCP). Alternatively, it is possible to use a metallic material having an insulating layer-coated surface.

The electrical wiring 50 is formed in a predetermined pattern from an electrically conductive material such for example as tungsten (W), molybdenum (Mo), manganese (Mn), or copper (Cu). The electrical wiring 50 serves as a feeder wiring for supplying a current to the light-emitting element 20 or a current from the light-emitting element 20.

The second insulating layer 42 laminated on the first insulating layer 41 has the recess (opening) 12 formed therethrough.

Each recess 12 has an inner peripheral surface 14 thereof inclined so that the recess 12 is larger in hole diameter on the one principal face 11a side of the substrate 10 than on a placement face side of the light-emitting element 20, and, the recess 12 is circular in plan configuration, for example. However, the recess opening may be given a polygonal shape such as a rectangular shape, or given no definite shape, without limitation to the circular shape. Moreover, the inner peripheral surface 14 does not necessarily have to be inclined.

Such a recess 12 allows the light emitted from the light-emitting element 20 to be reflected upwardly from the inner peripheral surface 14, and thus serves for an improvement in light extraction efficiency.

In order to improve the light extraction efficiency, it is advisable to use, as the material of formation of the second insulating layer 42, a porous ceramic material which exhibits a relatively good reflectivity to light (e.g., light in the ultraviolet range) such for example as an aluminum oxide sintered body, a zirconium oxide sintered body, or an aluminum nitride sintered body.

The recesses 12 are arranged in rows and columns in a square lattice pattern over the entire area of the one principal face 11a of the substrate 10. For example, the recesses 12 may be placed in a staggered arrangement, expressed differently, the recesses 12 may be arranged in zigzag form in two or more rows. Such an arrangement allows the light-emitting elements 20 to be placed with higher packing density, and thus achieves an increase in the degree of irradiance per unit area. As employed herein the term "placing the recesses in the staggered arrangement" is taken to mean placing the recesses in positions corresponding to lattice points of a rhombic lattice pattern.

The above-described substrate 10 comprising the stacked body 40 composed of the first insulating layer 41 and the second insulating layer 42 is, where the first insulating layer 41 or the second insulating layer 42 is formed of ceramics, etc., produced by following such procedural steps as given below, for example.

First, a plurality of ceramic green sheets produced by a heretofore known method are prepared. A ceramic green sheet corresponding to a layer having recesses 12 is provided with recess 12-equivalent holes by means of punching or otherwise. Then, after printing a metallic paste for forming the electrical wiring 50 onto a corresponding green sheet (not shown in the drawing), the green sheets are stacked together, with the printed metallic paste located in between. As the metallic paste for forming the electrical wiring 50, for example, it is possible to use a paste containing a metal such as tungsten(W), molybdenum (Mo), manganese (Mn), or copper (Cu). Next, the laminated body is fired, and the green sheets and the metallic paste are fired together at one time, whereupon the formation of the substrate 10 having the electrical wiring 50 and the recesses 12 is completed.

Moreover, where the first insulating layer 41 and the second insulating layer 42 are formed of resin, for example, the method of manufacturing the substrate 10 involves the following procedural steps, however another steps may be included in the method.

First, precursor sheets of thermosetting resin are prepared. Next, a metal-made lead terminal which constitutes the electrical wiring 50 is interposed between the precursor sheets, and, a plurality of precursor sheets are stacked together so that the lead terminal can be embedded in the precursor sheets. As the material for forming the lead terminal, for example, it is possible to use a metal material such as copper (Cu), silver (Ag), aluminum (Al), an iron (Fe)-nickel (Ni)-cobalt (Co) alloy, or an iron (Fe)-nickel (Ni) alloy. Then, after forming recess 12-equivalent holes in the precursor sheets by means of lasering, etching, or otherwise, the precursor sheets are cured under heat, whereupon the formation of the substrate 10 is completed. In the case of forming the recess 12 by lasering, the recess-forming operation may be effected after curing the precursor sheets under heat.

Meanwhile, inside the recess 12 of the substrate 10, there are provided the connection pad 13 electrically connected to the light-emitting element 20, the light-emitting element 20 connected to the connection pad 13 via a joining material 15 such as solder, a gold (Au) wire, or an aluminum (Al) wire, the sealing material 30 for sealing the light-emitting element 20, a detecting element 18, etc.

For example, the connection pad 13 is composed of a metallic layer formed of a metal material such as tungsten (W), molybdenum (Mo), manganese (Mn), or copper (Cu). On an as needed basis, a nickel (Ni) layer, a palladium (Pd) layer, a gold (Au) layer, etc. may additionally be laminated on the metallic layer. Such a connection pad 13 is connected to the light-emitting element 20 via the joining material 15 such as solder, a gold (Au) wire, or an aluminum (Al) wire.

Moreover, for example, the light-emitting element 20 is constructed of a light-emitting diode obtained by laminating an n-type semiconductor layer and a p-type semiconductor layer formed of a semiconductor material such as gallium arsenide (GaAs) or gallium nitride (GaN) on an element substrate 21 such as a sapphire substrate, a light-emitting diode obtained by bonding p-type and n-type semiconductor layers to a metallic substrate such as a copper-tungsten (CuW) substrate, or an organic EL (Electro-Luminescence) element having an organic material-made semiconductor layer.

The light-emitting element 20 comprises: a semiconductor layer 22 having a light-emitting layer; and element electrodes 23 and 24 formed of a metal material such as gold, silver (Ag), or aluminum, which are each connected, via the joining material 15 such as solder, a gold (Au) wire, or an aluminum (Al) wire, to the connection pad 13 disposed on the substrate 10, and thus, the light-emitting element 20 is connected to the substrate 10 by wire bonding. In response to the current passing between the element electrodes 23 and 24, the light-emitting element 20 emits light having a predetermined wavelength at a predetermined luminance. Note that the element substrate 21 may be omitted from the construction. Moreover, the connection between the element electrode 23, 24 of the light-emitting element 20 and the connection pad 13 may be established by the heretofore known flip-chip bonding technique using solder, etc. as the joining material 15.

This embodiment employs an LED (Light Emitting Diode) which emits ultraviolet light in a light emission spectrum with peak wavelengths ranging from 280 nm to 440 nm, for example, for the light-emitting element 20. That is, in this embodiment, a UV-LED (UltraViolet-Light Emitting Diode) element is adopted for use as the light-emitting element 20. The light-emitting element 20 is formed by a heretofore known thin-film forming technique.

The sealing material 30 seals the light-emitting element 20. As the sealing material 30, an insulating material such as a highly light-transmittable resin material is used. By sealing the light-emitting element 20 to protect the light-emitting element 20, intrusion of external moisture in the light-emitting element 20 is prevented, or external impact applied to the light-emitting element 20 is absorbed.

Moreover, by using, as the sealing material 30, a material having a refractive index which falls in between the refractive index of the element substrate 21 constituting the light-emitting element 20 (a refractive index of 1.7 in the case of sapphire) and the refractive index of air (a refractive index of about 1.0), such for example as a silicone resin having a refractive index of about 1.4, it is possible to achieve an improvement in light extraction efficiency in the light-emitting element 20.

Such a sealing material 30 is formed by, after mounting the light-emitting element 20 on the substrate 10, applying a precursor of, for example, silicone resin so as to fill the recess 12, and thereafter curing the resin precursor.

The light-transmittable member 60, which serves to provide protection for the constituent components, including the substrate 10, the light-emitting element 20, and the sealing material 30, may be formed of glass or the like, for example.

(First Supply Section)

As shown in FIG. 1, a supply section (first supply section 90a) 90 has a porous portion 90a1 through which a gas is supplied to the photo-curable material 250b.

Moreover, as described earlier, the porous portion 90a1 of the first supply section 90a is disposed in alignment with or upstream from the irradiation section 80. In this embodiment, as shown in FIG. 1, the porous portion 90a1 of the first supply section 90a is located upstream from the irradiation section 80.

A gas flowmeter M1 may be disposed in an intermediate part of a first introducing portion 90a2 which will hereafter be described, and, oxygen meters M2, namely an oxygen meter M2a and an oxygen meter M2b may be disposed below the porous portion 90a1 and below the irradiation section 80, respectively. The gas flowmeter M1 and the oxygen meters M2 are not essential components.

As the gas, it is possible to use an inert gas, such as nitrogen, which is less reactive with radicals present in the photo-curable material.

In the thereby constructed light irradiation device 100 according to the present embodiment, the porous portion which supplies a gas to a photo-curable material is located upstream from the irradiation section capable of irradiation of the photo-curable material with light. With the consequent effective reduction of the concentration of atmospheric oxygen in a region irradiated with light, etc., it is possible to restrain radicals generated by the irradiation of the photo-curable material with light from reacting with atmospheric oxygen, and thereby improve curability of the photo-curable material. Thus, the photo-curable material 250b can be conveyed at a faster rate, which leads to an improvement in productivity. Moreover, for example, also in the case of using an element of relatively low capability of generating radicals in the photo-curable material 250b as the light-emitting element 20 of the irradiation section 80, curability impairment in the photo-curable material can be suppressed.

Moreover, the placement of the porous portion 90a1 in the first supply section 90a allows the gas to be supplied evenly to a relatively wide area of the photo-curable material. With the consequent effective reduction of the concentration of oxygen around the photo-curable material, further improvement in uniformity in curing of the photo-curable material can be achieved. For example, variations in gas supply can be effectively reduced both in the conveyance direction of the photo-curable material 250b (length direction) and in a horizontal direction, or a width direction perpendicular to the conveyance direction (the second direction, or the depth direction of FIG. 1), in consequence whereof a higher degree of uniformity in oxygen concentration around the photo-curable material 250b can be achieved. The foregoing effects will hereafter be described in detail with reference to FIG. 4.

As specific exemplary of the porous portion 90a1 in this embodiment, it is possible to use a member which incurs a pressure loss of 6 to 65 Pa between an upstream end and a downstream end of the porous portion 90a1 under the passage of the gas.

The loss of pressure in the porous portion 90a1 has been determined by, after blowing air into a sample, measuring a pressure difference between the upstream-side part and the downstream-side part of the sample with use of U-tube manometer. In the measurement, with each of the air blow inlet and outlet of the sample shaped in a square measuring 0.25 m by 0.25 m, air has been blown into the sample for 60 seconds at an air velocity of 0.1 m/s and at a flow rate of 0.375 m$^3$/min.

As the material of formation of the porous portion 90a1, for example, it is possible to use ceramics, metal, or resin in porous form, mesh form, or fibrous form. Examples of ceramic include cordierite, and, for example, it is possible to use a cordierite material in porous form having a raw-material particle size of 300 to 500 μm, an average pore diameter of 150 to 250 μm, and a porosity of 30% or above, or more specifically a porosity which is greater than or equal to 30% but less than or equal to 60%. Examples of metal include bronze and stainless steel, and, for example, use can be made of a porous sintered metal material having a hole diameter of 0.3 to 2.0 mm and a porosity of 30% or above, or more specifically a porosity which is greater than or equal to 30% but less than or equal to 60%. Examples of metal further include SUS, or stainless steel, iron, and nickel, and, for example, it is possible to use a meshed metallic gauze having a wire size of 0.1 to 0.3 mm, a mesh opening of 0.15 to 1.0 mm, and an aperture ratio of 30 to 50%. Examples of resin include polyester, acrylic, and polyamide, and, for example, it is possible to use a nonwoven fabric having a porous structure formed of resin fibers and an adhesive, which is 100 to 500 g/m$^2$ in weight per unit area. Examples of resin further include polyurethane, epoxy, and polyimide, and, it is possible to use a porous material of such a resin in foam form (foamed resin).

The above-described porosity is a measure of the volumetric proportion of voids in a substance as a whole. For example, in the case of porous ceramics, the porosity corresponds to an open porosity defined in JIS R 1634:1998, and, in the case of porous sintered metal, the porosity corresponds to an open porosity defined in JIS Z 2501:2000.

Moreover, as shown in FIG. 1, the first supply section 90a includes a space portion 90aS which is continuous with the porous portion 90a1. A gas can be evenly supplied to the porous portion 90a1 through the space portion 90aS. The space portion 90aS may be made equal in size to the porous portion 90a1 in top plan configuration. The space portion 90aS may be made larger in thickness than the porous portion 90a1. With such a space portion, the gas is caused to fill the space portion before delivery. This allows the gas to be supplied to the entire irradiation section more evenly, and thus ambient oxygen concentration can be reduced more uniformly.

Moreover, in this embodiment, the first supply section 90a further includes a first introducing portion 90a2 for introducing a gas into the porous portion 90a1 through the space portion 90aS. The section of the flow channel of the first introducing portion 90a2 taken in a direction perpendicular to the flow direction in the channel may be made smaller in area than the section of the flow channel of the porous portion 90a1 taken in a direction perpendicular to the flow direction in the channel.

In this embodiment, the first supply section 90a is constructed of successively arranged members which comprise, in top-to-bottom order, the first introducing portion 90a2, the space portion 90aS, and the porous portion 90a1, and receives therein a flowing gas which is eventually delivered toward the photo-curable material 250b from the lower end of the porous portion 90a1.

Moreover, a distance between that the photo-curable material 250b and one of the ends of the porous portion 90a1 of the first supply section 90a located closer to the photo-curable material 250b may be set at 5 to 15 mm, for example.

In this embodiment, the distance between the photo-curable material 250b-side end of the porous portion 90a1 of the first supply section 90a and the photo-curable material 250b may be adjusted to be shorter than a distance between the irradiation section 80 and the photo-curable material 250b. This allows the first supply section 90a to achieve more effective reduction in oxygen concentration around the photo-curable material 250b.

Moreover, the first supply section 90a may be configured to allow the gas to be delivered downstream from the porous portion 90a1 rather than allowing the gas to be delivered straightforwardly in a downward direction from the porous portion 90a1. This enables more effective reduction in oxygen concentration around the region irradiated with light from the irradiation section 80.

The porous portion 90a1 of the first supply section 90a may be disposed in alignment with the irradiation section 80, or disposed so as to partly overlap with the irradiation section 80, rather than being located upstream from the irradiation section 80 as described above. In this case, the porous portion 90a1 may be configured to cover part or the whole of the region irradiated with light from the irradiation section 80 as seen in a transparent top plan view. Alternatively, the porous portion 90a1 may be disposed so as to partly overlap with the region irradiated with light from the irradiation section 80 as seen in a transparent top plan view. This makes it possible to effect gas supply in nearly timed relation to the irradiation of the photo-curable material 250b with light by the irradiation section 80, and thereby achieve more effective reduction in oxygen concentration.

Second Embodiment

Figure 3:
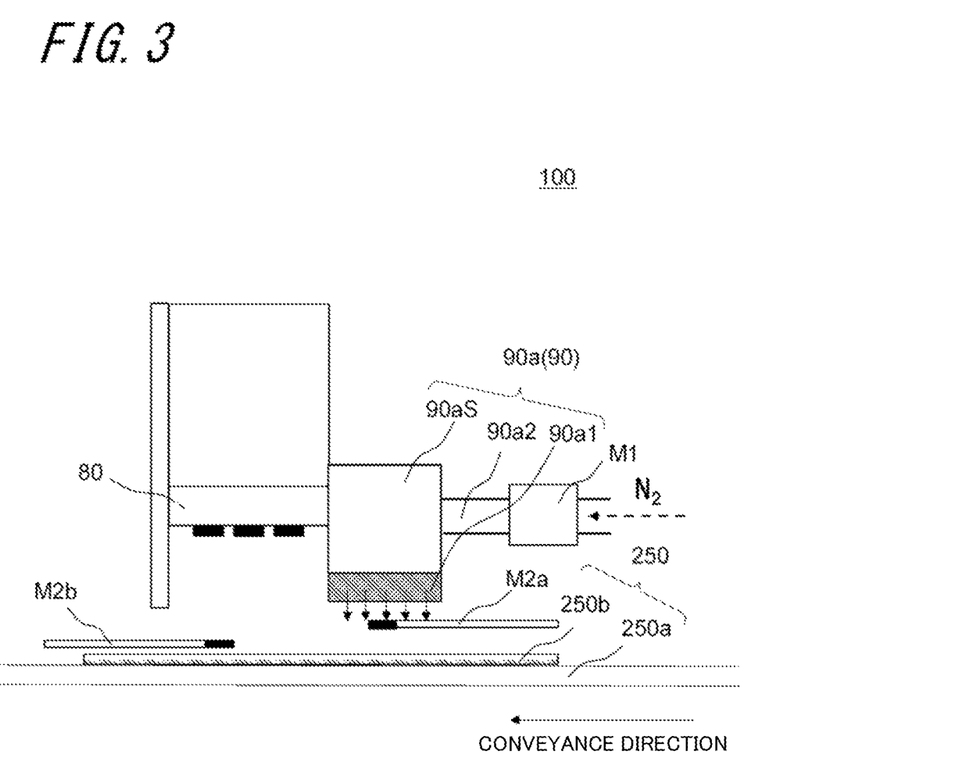
FIG. 3 is a side view showing a light irradiation device according to a second embodiment of the invention.

FIG. 3 is a side view showing the light irradiation device according to a second embodiment of the invention, which differs from the light irradiation device according to the first embodiment in the structure of the supply section 90. The following description deals mainly with the points of difference in structure from the light irradiation device 100 shown in FIG. 1, and, such constituent components as are common to those of the first embodiment are identified with the same reference symbols, and the descriptions thereof are omitted.

In this embodiment, as contrasted to the preceding embodiment, the first introducing portion 90a2 allows the gas to be delivered toward the space portion 90a5 in a direction which differs from the direction of the normal to the surface of the photo-curable material 250b. In other words, the first introducing portion 90a2 allows the gas to be delivered toward the space portion 90a5 in a direction which is not perpendicular to the surface of the photo-curable material 250b.

More specifically, in this embodiment, as shown in FIG. 3, the first supply section 90a is constructed of successively arranged members which comprise, in top-to-bottom order, the space portion 90aS with the first introducing portion 90a2 connected to a side face thereof, and the porous portion 90a1. Then, a gas flows in such a first supply section 90a, and the gas is eventually delivered toward the photo-curable material 250b from the lower end of the porous portion 90a1. Here, the first introducing portion 90a2 is connected to the side face of the space portion 90aS while being oriented in parallel with the conveyance direction of the photo-curable material 250b.

Also in this case, such advantageous effects as achieved by the light irradiation device 100 according to the first embodiment can be obtained. Moreover, connecting the first introducing portion 90a2 to the side face of the space portion 90aS or the porous portion 90a1 affords greater flexibility in device design and size reduction, and an improvement in gas supply efficiency.

Figure 4A:
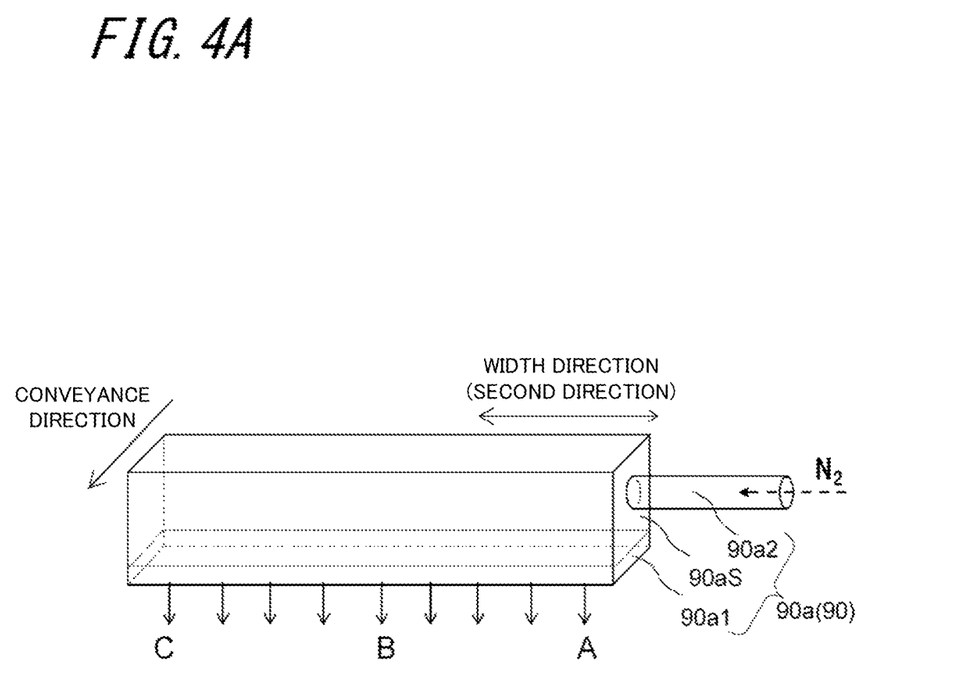
FIG. 4A is a perspective view showing a first supply section of a modified example in the light irradiation device shown in FIG. 3.
Figure 4B:
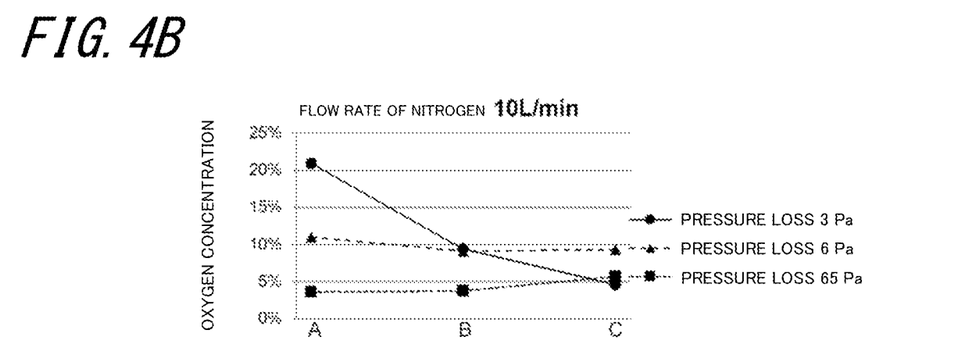
FIGS. 4B to 4D are charts indicating oxygen concentration around a photo-curable material in the modified example in the light irradiation device shown in FIG. 3.
Figure 4C:
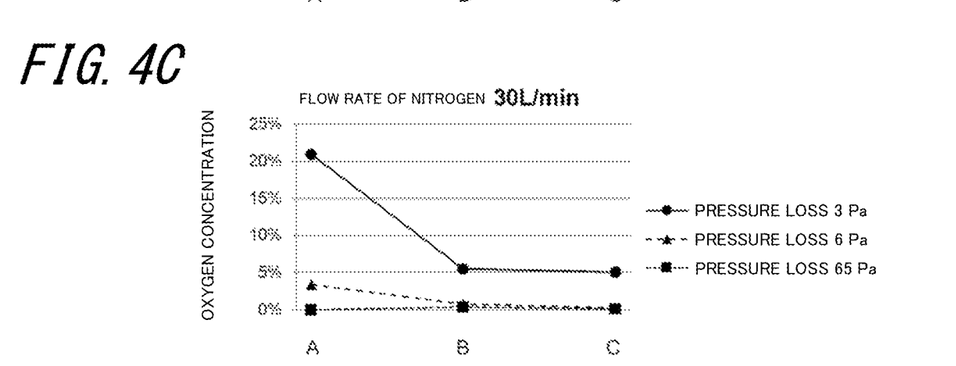
Figure 4D:
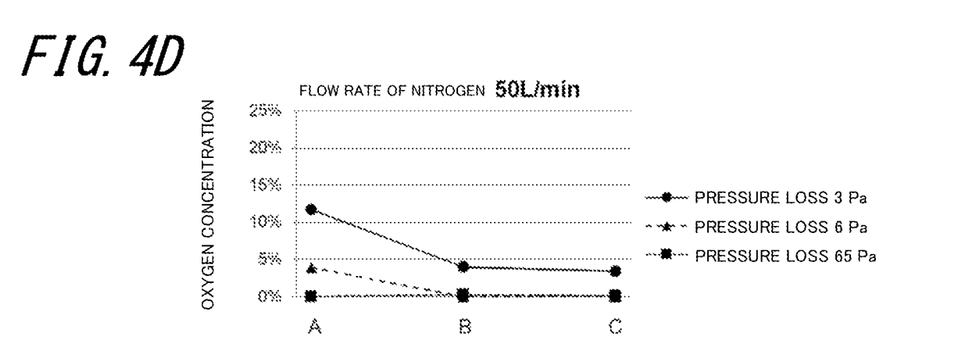

FIG. 4A is a perspective view showing the first supply section of a modified example in the light irradiation device shown in FIG. 3. FIGS. 4B to 4D are charts indicating oxygen concentration around the photo-curable material in the modified example in the light irradiation device shown in FIG. 3.

As shown in FIG. 4A, the first introducing portion 90a2 is connected to the side face of the space portion 90a5 while being oriented in parallel with the width direction which is perpendicular to the conveyance direction of the photo-curable material 250b.

In this modified example, nitrogen used as the gas has been passed through the first introducing portion 90a2 at three different flow rates, namely 10 L/min, 30 L/min, and 50 L/min. Then, oxygen concentration measurement has been conducted at each of a position A, a position B, and a position C below the porous portion 90a1. The positions A, B, and C are arranged side by side in the horizontal direction, or the width direction perpendicular to the conveyance direction. The position A is spaced away from one end of the porous portion 90a1 in the width direction by a distance of 200 mm, the position B is spaced away from the same end by a distance of 100 mm, and the position C is spaced away from the same end by a distance of 30 mm.

Use has been made of the porous portions 90a1 configured to incur pressure losses of 3 Pa, 6 Pa, and 65 Pa, respectively, between the first supply section 90a-side end and the photo-curable material 250b-side end thereof. Flow rate is expressed in the unit of L/min unless otherwise specified.

With a nonwoven fabric filter made of a fibrous material (polyester resin-made material which is 100 g/m² in weight per unit area) set as the porous portion 90a1, oxygen concentration measurement has been conducted by an oxygen meter in a location spaced downwardly from the bottom of the porous portion 90a1 by a distance of 10 mm under conditions where the degree of purity of inflow nitrogen is 99.9999% and the photo-curable material 250b remains unconveyed.

In FIGS. 4B to 4D, there is shown the result of measurement. The measurement result showed that, as the flow rate of nitrogen increases from 10 L/min to 30 L/min, and from there to 50 L/min, then the concentrations of oxygen at the positions A, B, and C below the porous portion 90a1 become more and more uniform with gradual decrease, and also showed that, the higher the pressure loss level, the greater the degree of uniformity in oxygen concentration, and the lower the oxygen concentration level, regardless of the level of flow rate.

It will thus be seen that the placement of the porous portion 90a1 in the first supply section 90a allows the gas to be supplied evenly to a relatively wide area of the photo-curable material, in consequence whereof an effective reduction in oxygen concentration around the photo-curable material can be achieved. This enables further improvement in uniformity in curing of the photo-curable material. For example, variations in gas supply can be effectively reduced in the width direction perpendicular to the conveyance direction of the photo-curable material 250b (the depth direction of FIG. 1), in consequence whereof an improvement in uniformity in curing of the photo-curable material 250b in the width direction can be achieved.

Third Embodiment

Figure 5:
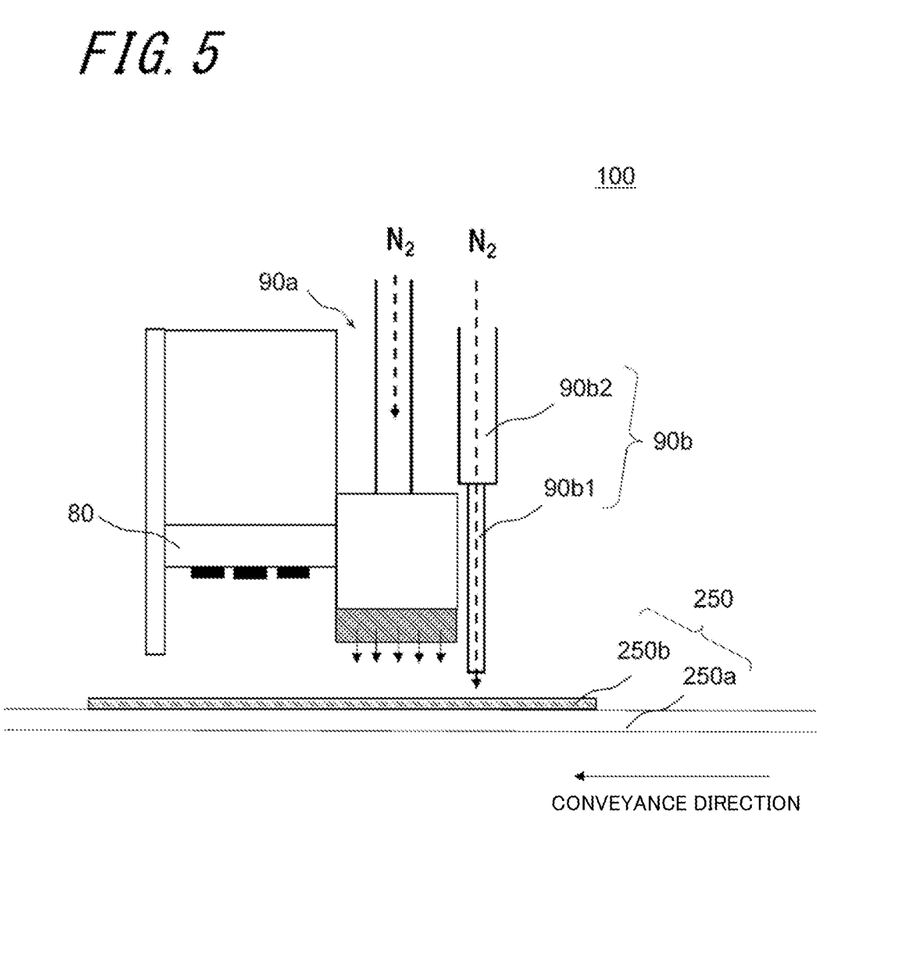
FIG. 5 is a side view showing a light irradiation device according to a third embodiment of the invention.

FIG. 5 is a side view showing the light irradiation device according to a third embodiment of the invention, which differs from the light irradiation device according to the first embodiment in the structure of the supply section 90. The following description deals mainly with the points of difference in structure from the light irradiation device 100 shown in FIG. 1, and, such constituent components as are common to those of the first embodiment are identified with the same reference symbols, and the descriptions thereof are omitted.

In this embodiment, as shown in FIG. 5, the supply section 90 comprises, in addition to the first supply section 90a, a second supply section 90b which can supply a gas, and the second supply section 90b is located upstream from the first supply section 90a. The first supply section 90a is made structurally similar to the first supply section 90a shown in FIG. 1.

In this construction, such advantageous effects as achieved by the light irradiation device 100 according to the first embodiment can be obtained more effectively. That is, since the second supply section 90b performs gas supply prior to gas supply by the first supply section 90a, it follows that a reduction in oxygen concentration can be accomplished in two stages.

As the gas which is supplied by the second supply section 90b, as is the case with the first supply section 90a, it is possible to use an inert gas, such as nitrogen, which is less reactive with radicals present in the photo-curable material. The gas supplied by the first supply section 90a and the gas supplied by the second supply section 90b may either be identical with or differ from each other.

Moreover, in this embodiment, the photo-curable material 250b-side end of the second supply section 90b may comprise a nozzle 90b1. Although no specific limitation is imposed upon the form of the nozzle 90b1, for example, the nozzle 90b1 may be made as a slit nozzle having a narrow elongate opening extending in the horizontal direction, or the width direction perpendicular to the conveyance direction of the photo-curable material 250b, or made as a nozzle having a plurality of openings aligned in the width direction. That is, as contrasted to the first supply section 90a, in the direction of gas supply to the photo-curable material 250b, the second supply section 90b may have higher directionality toward the photo-curable material 250b. This allows the second supply section 90b to restrain atmospheric oxygen from flowing through the first supply section 90a located downstream therefrom, and the region irradiated with light from the irradiation section 80 located further downstream therefrom.

The second supply section 90b may further comprise a second introducing portion 90b2 for introducing a gas into the nozzle 90b1. The section of the flow channel of the second introducing portion 90b2 taken in a direction perpendicular to the flow direction in the channel may be made larger in area than the section of the flow channel of the nozzle 90b1 taken in a direction perpendicular to the flow direction in the channel. This makes it possible to increase the velocity of flow toward the photo-curable material, and thereby reduce oxygen concentration effectively.

It is advisable that the section of the flow channel of the porous portion 90a1 of the first supply section 90a taken in a direction perpendicular to the flow direction in the channel is larger in area than the section of the flow channel of the nozzle 90b1 of the second supply section 90b taken in a direction perpendicular to the flow direction in the channel.

Moreover, the flow rate of the gas supplied from the first supply section 90a may be adjusted to be higher than the flow rate of the gas supplied from the second supply section 90b.

Instead of the above-mentioned nozzle, like the first supply section 90a, the second supply section 90b may be configured to have a porous portion 90a1. In this case, the porous portion of the first supply section 90a and the porous portion of the second supply section 90b may be configured to incur different levels of pressure loss.

Fourth Embodiment

Figure 6:
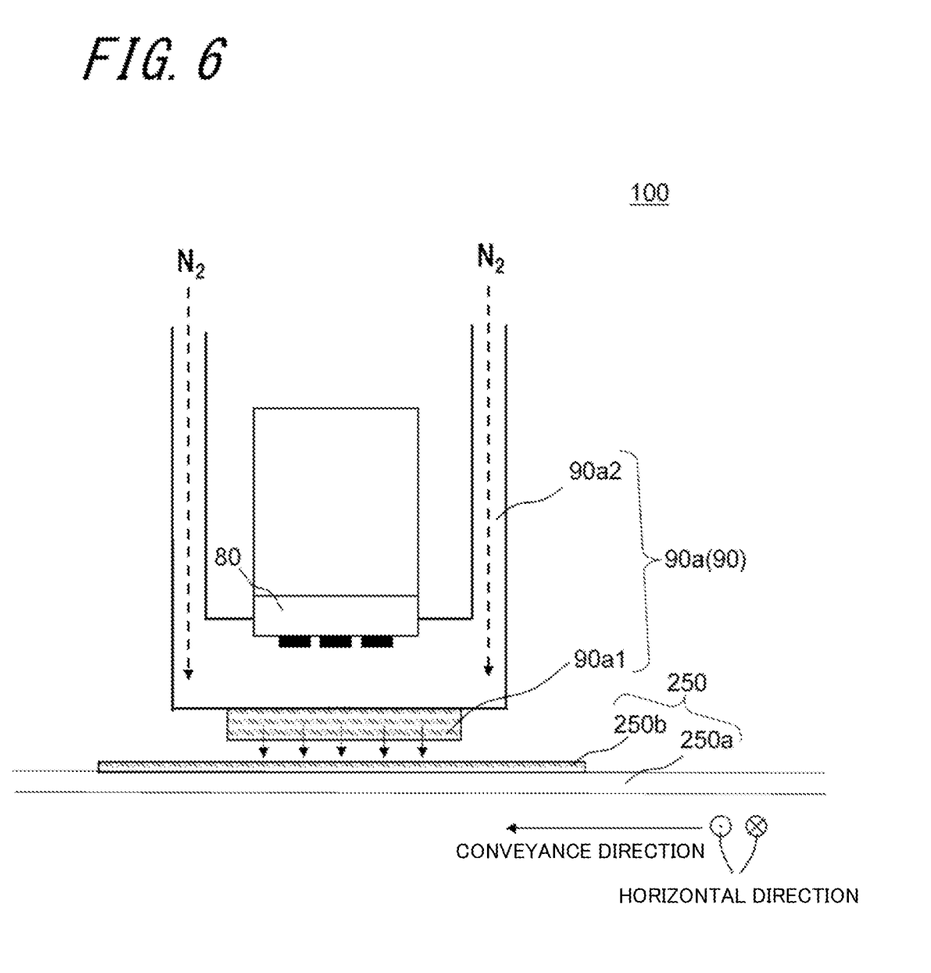
FIG. 6 is a side view showing a light irradiation device according to a fourth embodiment of the invention.

FIG. 6 is a side view showing the light irradiation device according to the first embodiment of the invention. The following description deals mainly with the points of difference in structure from the light irradiation device 100 shown in FIG. 1, and, such constituent components as are common to those of the preceding embodiment are identified with the same reference symbols, and the descriptions thereof are omitted.

In this embodiment, as shown in FIG. 6, the first supply section 90a is, at least partly, located between the irradiation section 80 and the photo-curable material 250b. For example, in this embodiment, the porous portion 90a1 is located between the irradiation section 80 and the photo-curable material 250b. The irradiation section 80 is capable of irradiating the photo-curable material 250b with light.

This arrangement makes it possible to obtain such advantageous effects as achieved by the light irradiation device 100 according to the preceding embodiment, as well as to reduce the dimension from the upstream end to the downstream end of the light irradiation device.

In this embodiment, the porous portion 90a1 has a light-transmittable nature. The porous portion 90a1 is made transmissive to light in a range of wavelengths conducive to curing of the photo-curable material 250b. For example, where an ultraviolet-curable material is used, the porous portion 90a1 is configured to effectively transmit ultraviolet rays therethrough. In this case, the photo-curable material 250b can be irradiated, through the porous portion 90a1 of the first supply section 90a, with light. That is, this allows the first supply section 90a to achieve effective reduction in oxygen concentration in the region irradiated with light from the irradiation section 80.

As the material for forming the porous portion 90a1, it is possible to use a light-transmittable material for such as example, glass, silicone, or polyethylene terephthalate (PET), whose porous characteristics, including porosity and pore diameter, are similar to those of the above-described material used for the first embodiment, for example.

Moreover, in this embodiment, as shown in FIG. 6, the first supply section 90a is configured so that the gas can be supplied to the porous portion 90a1 from upstream and downstream of the irradiation section 80. In the above-described embodiment, the supply of the gas is effected in advance of the arrival of the photo-curable material at a region irradiated with light. In contrast, in this embodiment, the gas is supplied directly to the region where the photo-curable material is irradiated with light from the irradiation section 80, in consequence whereof more effective reduction in oxygen concentration can be achieved.

Instead of or in addition to being configured to allow the gas to be supplied to the porous portion 90a1 from upstream and downstream of the irradiation section 80 as described above, the first supply section 90a may be configured to allow the gas to be supplied to the porous portion 90a1 from both sides of the irradiation section 80 in a horizontal direction (a horizontal direction which crosses the conveyance direction). In another alternative, the first supply section 90a may be configured to allow the gas to be supplied to the porous portion 90a1 throughout the 360° range about the irradiation section 80.

(Printer)

A printer according to an embodiment of the invention comprises the above-described light irradiation device 100 and a conveying section 210 which can convey the photo-curable material 250b downstream, the photo-curable material 250b being located on the upper surface of the conveying section 210, and comprising a photo-curable resin containing an initiator. The following description deals with a printer 200 as shown in FIGS. 7A and 7B by way of example. The initiator is a compound which serves to initiate a polymerization reaction. Note that any construction that incorporates the described light irradiation device 100 may be adopted for the printer without limitation to the following example.

The printer 200 comprises: a conveying section 210 for conveying a medium to be printed 250a; a printing section 220 which serves as a printing mechanism for performing printing on the conveyed medium to be printed 250a; the above-described light irradiation device 100 for irradiating the medium to be printed 250a that has undergone printing process, with ultraviolet light; and a control mechanism 230 for controlling light emission from the light irradiation device 100.

The conveying section 210 serves to convey the medium to be printed 250a in such a manner that the medium to be printed 250a passes through the printing section 220 and the light irradiation device 100 sequentially in the order named. The conveying section 210 comprises a placement table 211 and a pair of conveying rollers 212 which is located opposite to each other and is rotatably supported. The conveying section 210 feeds the medium to be printed 250a supported by the placement table 211 to a region between the pair of conveying rollers 212, and rotates the conveying rollers 212 to deliver the medium to be printed 250a in the conveyance direction thereof.

The printing section 220 serves to adhere the photo-curable material 250b to the medium to be printed 250a which has been conveyed thereto via the conveying section 210. The printing section 220 is configured to discharge droplets containing the photo-curable material 250b toward the medium to be printed 250a for adhesion of the photo-curable material 250b to the medium to be printed 250a. While an ultraviolet-curable ink is used as the photo-curable material 250b in this example, for example, a photoresist may also be adopted for use.

In this example, a line-type printing station is used for the printing section 220. In the printing section 220 having a plurality of linearly arranged discharge orifices 220a, the ultraviolet-curable ink 250b is discharged from the discharge orifices 220a. The discharged ultraviolet-curable ink 250b is caused to spread out by a roll coater 220b. That is, in this embodiment, a coating of the ultraviolet-curable ink 250b is applied over the entire surface of the medium to be printed 250a. Thus, the printing section 220 performs printing on the medium to be printed 250a by allowing the ink discharged from the discharge orifices 220a to adhere to the conveyed medium to be printed 250a in a direction perpendicular to the arrangement direction of the discharge orifices 220a.

Although the line-type printing station exemplifies the printing mechanism in this example, the printing mechanism is not limited to this, and thus, for example, a serial-type printing station, or a line-type or serial-type spraying head (for example, ink-jet head) may be adopted for use. Alternatively, as the printing mechanism, it is possible to use an electrostatic head configured so that static electricity is caused to accumulate on the medium to be printed 250a for adhesion of the photo-curable material 250b to the medium to be printed 250a with the force of the static electricity, or an immersion device configured so that the medium to be printed 250a is immersed in the photo-curable material 250b in liquid form for adhesion of the photo-curable material 250b to the medium to be printed 250a. Moreover, Japanese hake (brush), a brush, a roller, etc. may be used for the printing mechanism.

As described earlier, the light irradiation device 100 serves to cure the photo-curable material 250b adherent to the medium to be printed 250a which has been conveyed thereto via the conveying section 210. The light irradiation device 100 is located downstream from the printing section 220 in the conveyance direction. Thus, in the light irradiation device 100, the photo-curable material 250b which has adhered to the medium to be printed 250a in the printing section 220 is irradiated with light from the irradiation section 80 while being supplied with the gas from the supply section 90. With the consequent effective reduction of the concentration of atmospheric oxygen, it is possible to restrain radicals generated by the irradiation of the photo-curable material with light from reacting with atmospheric oxygen, and thereby improve curability of the photo-curable material.

The control mechanism 230 serves to control light emission from the light irradiation device 100. The memory of the control mechanism 230 stores information indicative of the characteristics of light such that curing of ink droplets discharged from the printing section 220 is relatively good. Specific examples of the information stored in the memory include wavelength distribution characteristics and numerical values representing illuminance (light emission intensity in each wavelength range) (W/cm$^2$) which are suited to curing of the discharged ink droplets.

In the printer 200, the conveying section 210 conveys the medium to be printed 250a in the conveyance direction. The printing section 220 discharges the ultraviolet-curable ink 250b toward the conveyed medium to be printed 250a to adhere the ultraviolet-curable ink 250b to the surface of the medium to be printed 250a. At this time, the ultraviolet-curable ink 250b may be caused to adhere either to the entire surface of the medium to be printed 250a by the roll coater 220b as described above or to part of the medium surface without using the roll coater 220b, or may also be caused to adhere to the medium surface in a predetermined adherent pattern. In this printer 200, the ultraviolet-curable ink 250b adherent to the medium to be printed 250a is cured by being irradiated with ultraviolet light emitted from the light irradiation device 100.

The printer 200 according to this embodiment affords the above-described advantageous effects produced by the light irradiation device 100.

Although the specific embodiments of the invention has been shown above, the invention is not limited to the above-described embodiments, and various modifications are possible without departing from the scope of the invention. For example, a configuration of one embodiment can be replaced with a configuration of another embodiment, and in addition, a configuration of another embodiment can be added to one embodiment.

REFERENCE SIGNS LIST

10: Substrate
11a: One principal face
12: Recess
13: Connection pad
14: Inner peripheral surface
15: Joining material
16: Lens
17: Adhesive for lens
20: Light-emitting element
21: Element substrate
22: Semiconductor layer
23, 24: Element electrode
30: Sealing material
40: Stacked body
41: First insulating layer
42: Second insulating layer
50: Electrical wiring
60: Light-transmittable member
80: Irradiation section
90: Supply section
90a: First supply section
90a1: Porous portion
90a5: Space portion
90a2: First introducing portion
90b: Second supply section
90b1: Nozzle
90b2: Second introducing portion
M1: Gas flowmeter
M2: Oxygen meter
100: Light irradiation device
200: Printer
210: Conveying section
211: Placement stand
212: Conveying roller
220: Printing means
220a: Discharge orifice
250: Target object
250a: Medium to be printed
250b: Photo-curable material

The invention claimed is:

1. A light irradiation device, comprising:
a first supply section having a porous portion, the first supply section being capable of supplying a gas to a photo-curable material through the porous portion; and
an irradiation section disposed in alignment with the porous portion or disposed downstream from the porous portion, the irradiation section being capable of irradiating the photo-curable material with light.

2. The light irradiation device according to claim 1, wherein the porous portion comprises ceramics, metal, or resin.

3. The light irradiation device according to claim 1, wherein the porous portion comprises a porous, meshed, or fibrous part.

4. The light irradiation device according to claim 1, wherein the porous portion incurs a pressure loss of 6 to 65

Pa between an upstream end and a downstream end of the porous portion under a passage of the gas.

5. The light irradiation device according to claim 1, wherein the porous portion has a porosity which is greater than or equal to 30% but less than or equal to 60%.

6. The light irradiation device according to claim 1, wherein the first supply section further comprises a space portion which is continuous with the porous portion.

7. The light irradiation device according to claim 6, wherein the first supply section allows the gas to be supplied to the space portion in a direction which differs from a direction of a normal to a surface of the photo-curable material.

8. The light irradiation device according to claim 6, wherein the first supply section further comprises a first introducing portion which introduces the gas into the porous portion through the space portion, and
a section of a flow channel of the first introducing portion which section is taken in a direction perpendicular to a flow direction in the flow channel is smaller in area than a section of a flow channel of the porous portion which section is taken in a direction perpendicular to a flow direction in the flow channel.

9. The light irradiation device according to claim 1, wherein a distance between the photo-curable material and one of ends of the porous portion located closer to the photo-curable material is shorter than a distance between the irradiation section and the photo-curable material.

10. The light irradiation device according to claim 1, wherein the first supply section allows the gas to be delivered downstream from the porous portion.

11. The light irradiation device according to claim 1, further comprising:
a second supply section which can supply a gas upstream from the porous portion of the first supply section.

12. The light irradiation device according to claim 11, wherein a flow rate of the gas supplied from the first supply section is higher than a flow rate of the gas supplied from the second supply section.

13. The light irradiation device according to claim 11, wherein one of ends of the second supply section located closer to the photo-curable material comprises a nozzle.

14. The light irradiation device according to claim 13, wherein the second supply section further comprises a second introducing portion which introduces the gas into the nozzle, and
a section of a flow channel of the second introducing portion which section is taken in a direction perpendicular to a flow direction in the flow channel is larger in area than a section of a flow channel of the nozzle which section is taken in a direction perpendicular to a flow direction in the flow channel.

15. The light irradiation device according to claim 13, wherein a section of a flow channel of the porous portion which section is taken in a direction perpendicular to a flow direction in the flow channel is larger in area than the section of the flow channel of the nozzle which section is taken in a direction perpendicular to the flow direction in the nozzle.

16. A printer, comprising:
the light irradiation device according to; and
a conveying section which can convey the photo-curable material downstream,
the photo-curable material being located on an upper surface of the conveying section, the photo-curable material comprising a photo-curable material which comprises an initiator.

17. A light irradiation device, comprising:
a first supply section having a porous portion, the first supply section being capable of supplying a gas to a photo-curable material through the porous portion; and
an irradiation section disposed so that at least part of the first supply section is located between the irradiation section and the photo-curable material, the irradiation section being capable of irradiating the photo-curable material with light.

18. The light irradiation device according to claim 17, wherein the porous portion is transmissive to the light emitted from the irradiation section.

19. The light irradiation device according to claim 17, wherein the porous portion comprises glass, silicone, or polyethylene terephthalate.

20. The light irradiation device according to claim 17, wherein the first supply section is configured to allow the gas to be supplied to the porous portion from upstream and downstream of the irradiation section in a flow direction of the photo-curable material, or from both sides of the irradiation section in a horizontal direction which crosses the flow direction of the photo-curable material.

* * * * *